United States Patent [19]

Kazama et al.

[11] Patent Number: 4,897,801
[45] Date of Patent: Jan. 30, 1990

[54] DISPLAY TERMINAL EQUIPMENT WITH CONCURRENTLY OPERABLE PLURAL INPUT DEVICES

[75] Inventors: Yoshiharu Kazama; Motonobu Nagafuji, both of Hadano, Japan

[73] Assignee: Hitachi, Ltd., Tokyo, Japan

[21] Appl. No.: 85,768

[22] Filed: Aug. 17, 1987

[30] Foreign Application Priority Data

Aug. 25, 1986 [JP] Japan .................................. 61-197114

[51] Int. Cl.⁴ .............................................. G06F 3/037
[52] U.S. Cl. ...................................... 364/521; 340/717
[58] Field of Search ................... 364/521; 340/717, 721

[56] References Cited

U.S. PATENT DOCUMENTS

| | | | |
|---|---|---|---|
| 4,323,891 | 4/1982 | Akashi | 340/717 |
| 4,326,201 | 4/1982 | Enokizono | 340/717 |
| 4,651,299 | 3/1987 | Miyazaki et al. | 340/717 |

OTHER PUBLICATIONS

"A Multifunction Workstation: Hitachi Creative Workstation 2050", Hitachi Review, Apr. 1986, vol. 35, No. 2, pp. 73-78.

Primary Examiner—David L. Clark
Assistant Examiner—Mark K. Zimmerman
Attorney, Agent, or Firm—Antonelli, Terry & Wands

[57] ABSTRACT

In a display terminal equipment, a display device and a plurality of input devices are connected to a controller. Each input device is operated by an operator for inputting information. The controller controls the information entered from a different input device to be displayed on a different display area of the display device. It becomes possible for a plurality of operators to share a single display device and a single display terminal equipment while handling his or her own input device at the same time.

6 Claims, 4 Drawing Sheets

DISPLAY TERMINAL EQUIPMENT WITH CONCURRENTLY OPERABLE PLURAL INPUT DEVICES

BACKGROUND OF THE INVENTION

1. Field of the Invention

The present invention relates to a display terminal equipment and more particularly to a display terminal equipment with plural input devices which are concurrently operable for the input of data to a single display device.

2. Description of the Related Art

Recently, the control/process capabilities of terminal equipments and workstations having a display function have been improved greatly. It has now become possible to provide a plurality of display areas on the screen of a single display device and to allocate a different job to each area.

As the systems of forming a plurality of display areas, there are a simple horizontal split screen system, a window system for setting a display area at an arbitrary position, and a multiwindow system capable of setting a plurality of windows in an overlapped manner.

A multiwindow function is used, for example, in "A Multifunction Workstation: Hitachi Creative Workstation 2050" described in Hitachi Review, April 1986 Vol. 35 No. 2, pp. 73 to 78.

With conventional display terminal equipments (including workstations), input from an operator is handled one input after another for each display area. In other words, a plurality of operators cannot use one terminal equipment at the same time.

According to the above-described related art, if an operator is inputting data from a keyboard for word processing to create a document, another operator cannot execute a job of, for example, "floppy disk to print" unless the former operator stops his or her job and allows for the latter to use the keyboard. As the control/process capabilities of a terminal equipment with plural display areas have been improved, it is presently desired that a plurality of input devices such as keyboards be connected to the terminal equipment and operated at the same time to fully utilize such high capabilities.

SUMMARY OF THE INVENTION

It is an object of the present invention to provide a display terminal equipment wherein one display device can be used concurrently by a plurality of operators each using his or her own input device.

According to the present invention, a plurality of input devices are connected to a controller. Each input device is handled by an operator for the input of information. The controller controls the input devices such that information entered from a different input device is displayed at a different display position.

DESCRIPTION OF THE PREFERRED EMBODIMENT

An embodiment of this invention will be described in detail with reference to the accompanying drawings.

Figure 1A:
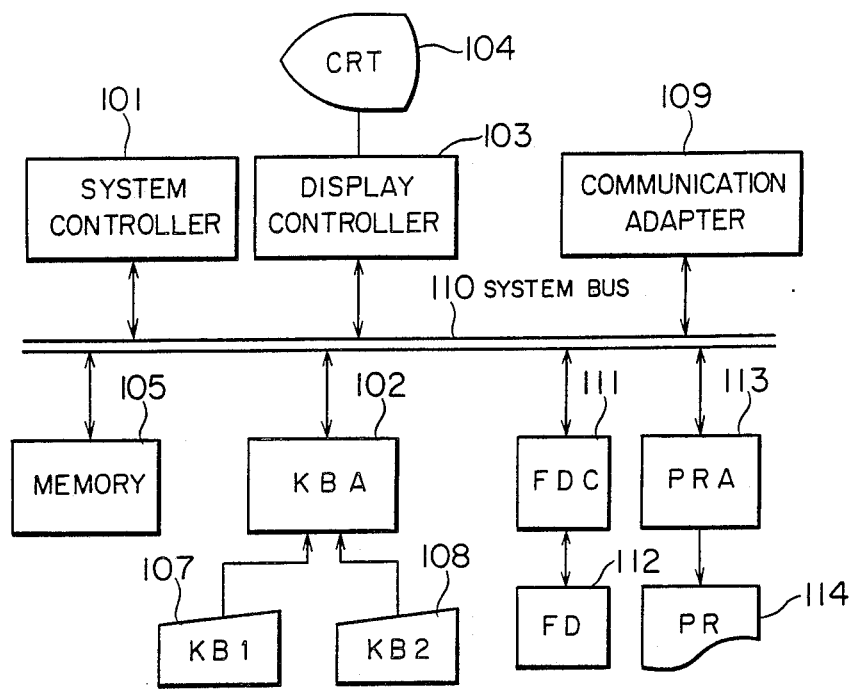
FIGS. 1a and 1b are block diagrams of an embodiment of the display terminal equipment according to the present invention.

FIG. 1a is a block diagram showing the overall arrangement of an embodiment of the display terminal equipment according to the present invention. In the Figure, for only one display device 104, there are provided two keyboards (KB) 107 and 108. Each keyboard 107, 108 is operated by an operator A, B for the input of his or her information. The input information is passed via a keyboard adapter (KBA) 102 to a system bus 110 and to a system controller 101. The received data by the system controller 101 is sent via the system bus 110 to a display controller 103. The display controller 103 converts the data into a display signal and sends it to the display device 104 for the display of the signal. Connected to the system bus 110 is a memory 105 storing control programs, data, management table and the like. Also connected to the system bus 110 are a communication adapter 109, a floppy disk (FD) 112 via a floppy disk controller (FDC) 111, a printer (PR) 114 via a printer adapter (PRA) 113, and etc.

A method of connecting a plurality of keyboards will now be described.

Figure 1B:
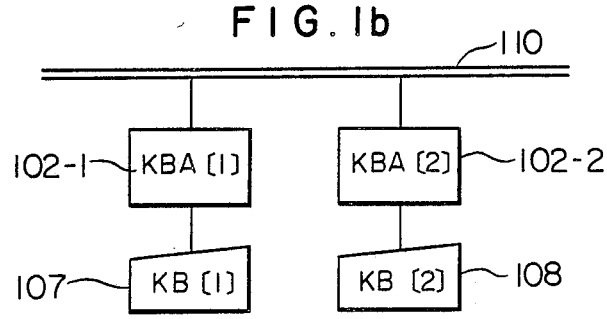

In the example shown in FIG. 1a, a multi-keyboard control type keyboard adapter KBA is used, which is cost effective for a number of keyboards and can be mounted compactly. FIG. 1b shows another simplified example of the keyboard connection method, wherein a plurality of pairs of a single known one-keyboard control type keyboard adapter KBA and a single keyboard are connected to the system bus. If the number of keyboards is small, the latter method may be used.

Where an entire screen of the display device 104 is used as a single display area, a plurality of operators each using his or her own keyboard may share a same job and input its data with a plurality of cursors displayed, under control of the system controller 101 and the display controller 103. In this case, the range of cursor motion is the same for all cursors so that the operators should be careful for the cursor positions so as not to overwrite the input data on the previously input data. However, it is useful in that the job can be inputted in short time by a plurality of operators.

A plurality of display areas may be provided on the screen of the display device 104. The display area includes split screens obtained by simply dividing the screen, and a window which can be set at an arbitrary position of the screen and used in priority over the split-screens. Also included is a multiwindow which can be set in plural and overlapped one upon another. Split screens and windows may be mixed on the same screen.

The correspondence among the input device, display area and job (process programs) is designated by a command inputted from an input device already allocated with a specific display area, and managed by the control programs of the display terminal equipment. However, at an initial state, only one display area (i.e., entire area of the screen) is designated and a specific input device previously registered in the system is allocated. A request/release of display area allocation and a magnification/reduction of a display area may be designated by a command inputted from an input device.

Figure 2A:
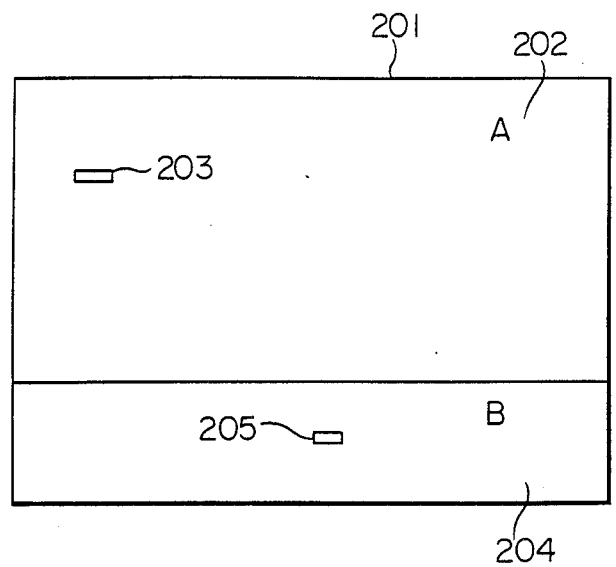
FIGS. 2a, 2b and 2c show examples of allocation of display areas of the display terminal equipment according to the present invention.

An example of horizontally split two screens is shown in FIG. 2a, wherein the information inputted by the operator A is displayed in a display area A 202 and the information inputted by the operator B in a display area B 204. The positions to which the operators A and B enter data are shown on the screen by cursors A 203 and B 205.

Figure 2B:
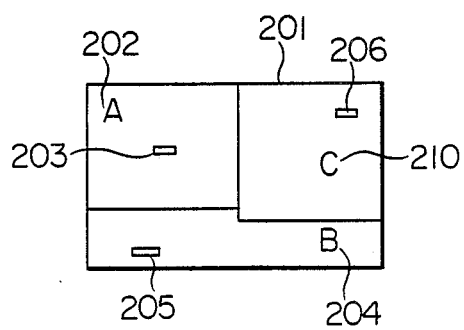
Figure 2C:
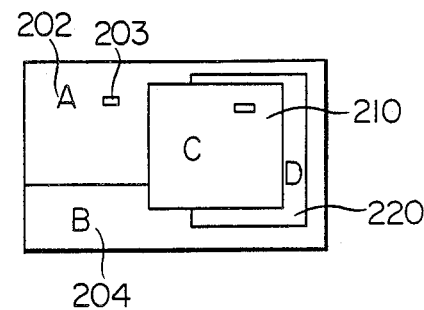

The display areas with two split screens and a window C is shown in FIG. 2b, and with two split screens and windows C and D in FIG. 2c.

The correspondence among the input device, display area and job (process programs) is managed by the control programs. An example of such correspondence as of FIG. 2c is shown in Table 1.

TABLE 1

Correspondence Table among Input Device, Display Area and Job

| Input Device | Display Area No. | Display Area Name | Job |
|---|---|---|---|
| KB[1] | 1 | Split screen A | JOB[1] |
| None | 2 | Split screen B | JOB[2] |
| KB[2] | 3 | Window C | JOB[3] |
| None | 4 | Window D | None |

As seen from Table 1, a keyboard is not allocated to the split screen B and the window D. The split screen B is allocated to JOB[2] for the display thereof, but input from a keyboard is not possible.

Figure 3:
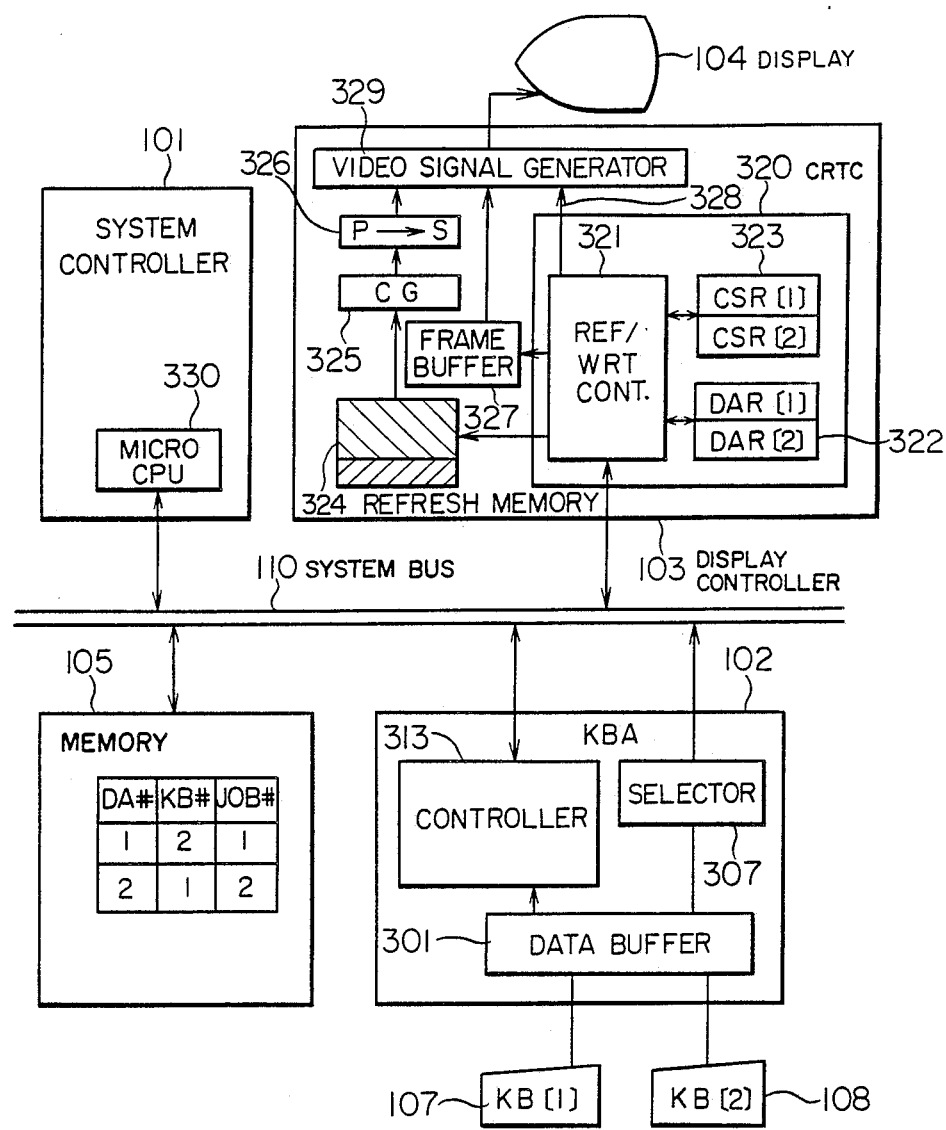
FIG. 3 is a block diagram showing the fundamental circuit elements of the equipment according to the present invention.

FIG. 3 details the block diagram of FIG. 1a.

Data inputted by the operator A through the keyboard 107 is stored in a data buffer 301 of the keyboard adapter 102 at the position allocated to the keyboard 107. Similarly, data inputted by the operator B through the keyboard 108 is stored in the data buffer 301 of the keyboard adapter 102 at the position allocated to the keyboard 108. The stored data are selected by a selector 307 under control of the controller 313 and a micro CPU 330 of the system controller 101. The selected data is added with a corresponding keyboard number to be loaded in a register of the micro CPU 330 via the system bus 110 (keyboard adapter 102 will be detailed later).

After receiving the keyboard number and data from the keyboard adapter 102, the micro CPU (control programs) refers to a management table stored in a main memory 105 and sends the data to the process programs corresponding to the keyboard number. The micro CPU also converts the keyboard number into a display area number to send it together with the data to the display controller 103 via the system bus 110. The management table shows for example that data from KB[1] should be sent to the processing program (or job) No. 2 and the display area No. 2. Of course, the micro CPU 330 can also send to the display controller 103 data other than that inputted from the keyboard, such as for example data which the processing program prepares and requests to send.

The display controller 103 is constructed of a CRT controller 320, a refresh memory 324 for storing character codes, a character generator 325, a parallel/serial converter 326, a frame buffer for graphics 327 and a video signal generator 329. The display area number and the input data from the system bus 110 are fetched in the CRT controller 320.

The CRT controller 320 is constructed of a refresh/write controller 321, display area registers 322 and cursor registers 323. The cursor registers 323 store cursor positions which are also character addresses of the data to be stored in the refresh memory 324, and store raster addresses of a preset cursors. Each register of the cursor registers 323 is provided for each display area, e.g., the cursor position for KB[1] is stored in a cursor register CSR[1] and the cursor position for KB[2] in a cursor register CSR[2].

The data entered from the system bus 110 is stored in the refresh memory 324 addressed by the character address from the cursor register 323 corresponding to the display area number, under control of the refresh/write controller 321.

Next, the values in the cursor registers 323 are renewed under control of the refresh/write controller 321 by referring to the values defining the horizontal and vertical display ranges stored in the corresponding display area register 322. Namely, if the values of the cursor register 323 indicate the horizontal and vertical display limits, they are renewed to the start values of the horizontal and vertical display ranges, respectively.

The data entered from the system bus 110 are written at the new cursor position decided as above in the refresh memory 324. The contents of the refresh memory 324 are read one character at a time in accordance with an address indicated by the refresh/write controller 321 and converted into image dots for display by the character generator 325. Thereafter, it is converted into a serial data by the parallel/serial converter 326 to be inputted to the video signal generator 329 whereat the data is converted into a video signal which in turn is sent to the display device 104 for the display thereof.

In the above operation, the character address and the raster address generated by the refresh/write controller 321 are compared with the contents of all the cursor registers 323. If they coincide with one another, a cursor display signal 328 is inputted to the video signal generator 329 and converted into a video signal which in turn is sent to the display device 104 to display the cursor.

As above, the data and cursor are displayed in a predetermined display area of the display device 104.

Figure 4:
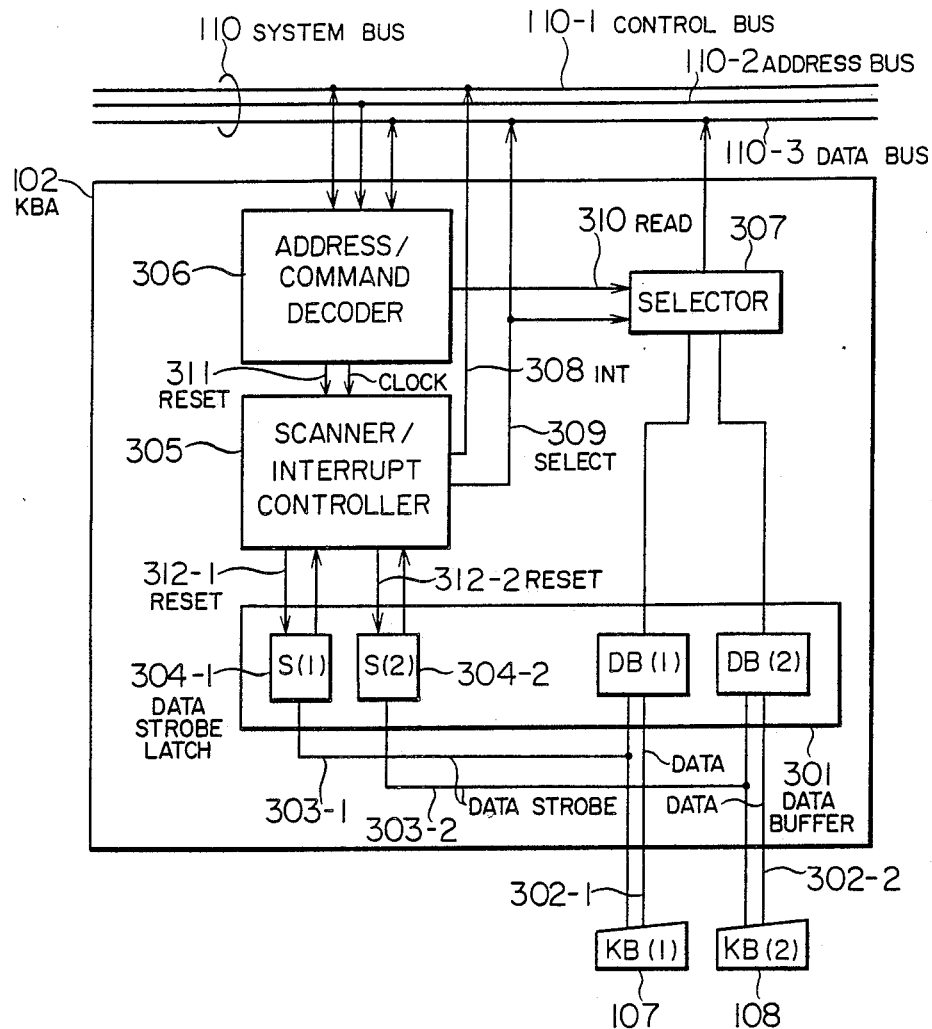
FIG. 4 is a detailed block diagram of the keyboard adapter shown in FIG. 3.

Next, the keyboard adapter 102 will be detailed with reference to FIG. 4.

The data inputted from the KB[1] 107 and KB[2]108 are stored in the corresponding data buffers DB[1] and DB[2] of the data buffer 301, via data lines 302-1 and 302-2 at the timings of data strobe signals 303-1 and 303-2. The data strobe signals 303-1 and 303-2 are also stored in the corresponding data strobe latches S[1] and S[2] of a data strobe latch (DSR) 304.

A scanner/interrupt controller (SIC) 305 counts clocks to obtain a timing signal of about 1 ms which is used as a scan period for scanning the data strobe latch 304. When it is detected that a signal is set in the data strobe latch S[2], it means that the data is stored in the data buffer BD[2]. Therefore, a select signal obtained from the scan signal enables the contents of the data buffer BD[2] to be passed to the selector 307, and the micro CPU 330 of the system controller 101 is interrupted via the system bus 110.

The interrupted micro CPU 330 issues a read command to the keyboard adapter KBA 102. An address command decoder 306 of the keyboard adapter 102 decodes the command to output a read signal 310 to the selector 307 so that the data in the data buffer BD[2] are delivered onto the data bus of the system bus 110. The select signal is also delivered onto the data bus at that time, the select signal being used as a keyboard number by the micro CPU (control programs) 330.

Immediately after the delivery of the data to the system bus 110, the interruption controller and the data strobe latch (DSR[1] or DSR[2]) are reset by reset signals 311 and 312 generated by the address command decoder 306.

As described above, the data from a plurality of keyboards are read concurrently as seen by the operators.

According to the present invention, a plurality of operators can share a single display device using his or her own input device. Where a plurality of display areas are provided on the screen, it is very useful in that a plurality of operators can input data independently.

We claim:

1. A display terminal equipment comprising:
a plurality of input means each operated by an operator for inputting information;
display means for displaying information;
control means connected to said display means for controlling different display information to be displayed at different positions on said display means; and
adapter means for interconnecting said plurality of input means and said control means, said adapter means includes means for adding identification information for identifying each of said input means to the display information inputted by the corresponding input means and for transferring said identification information and said display information to said control means;
wherein said control means comprises
a system bus,
a display controller connected to said system bus and having display range registers for storing display ranges of a split screen and windows and a plurality of cursor registers corresponding in number to display areas, said display controller controlling in such a manner that the renewal of the contents of said cursor registers is conducted within said display ranges and that the data received from said system bus are displayed at a position, on said display means, addressed by a cursor register corresponding to a display area number which is received together with said data and
a system control means including a memory and a system controller having at least one microprocessor, said memory has stored therein a control program for controlling said microprocessor, both of said system controller and said memory being connected to said system bus, said microprocessor controls said system bus, manages a correspondence between said input device and said display area, receives the data from said adapter means, adds said display area number to said data to be displayed on the area indicated by said number, and delivers said data together with said number to said display controller.

2. A display terminal equipment according to claim 1, wherein said adapter means comprises
a plurality of data buffers corresponding in number to a plurality of keyboards,
a selector connected between said data buffers and said system bus and
a controller for time divisionally scanning said data buffers, said controller including means for interrupting said system controller when there are data in a data buffer, and in response to a command from said system controller controlling said selector so as to output the data from a scanned and detected data buffer to said system bus and means for outputting a keyboard number obtained from a scan signal.

3. A display terminal equipment according to claim 1, wherein said display means is a CRT display device, and said display controller further comprises
a screen memory
a character generator for converting output data from said screen memory into image dots for display,
a parallel/serial converter for converting a parallel data from said character generator into serial data and outputting said serial data to said CRT display device, and
a CRT controller including a refresh/write controller, display range registers for storing display ranges of split screens and windows and a plurality of cursor registers corresponding in number to display areas, said display controller controlling in such a manner that the renewal of the contents of said cursor registers is conducted within said display range and that the data received from said system bus are displayed at a position, on said display means, addressed by a cursor register corresponding to a display area number which is received together with said data.

4. A display terminal equipment comprising:
a plurality of input means each operated by an operator for inputting information;
display means for displaying display information;
control means connected to said display means for controlling different display information to be displayed at different positions on said display means; and
adapter means for interconnecting said plurality of input means and said control means, said adapter means includes means for adding identification information for identifying each of said input means to the display information inputted by the corresponding input means and for transferring said identification information and said display information to said control means;
wherein said control means comprises
a system bus,
a display controller connected to said system bus and having a plurality of cursor registers for controlling the display of data received from said system bus at a position, on said display means, addressed by a cursor register corresponding to a cursor register number which is received together with said data and
a system control means including a memory and system controller having at least one microprocessor, said memory has stored therein a control program for said microprocessor, both of said system controller and said memory having connected to said system bus, said microprocessor controls said system bus, receives data from said adapter means, adds to said data said cursor register number corresponding to any one of said input means, and sends both the data and cursor register number to said display controller, and
wherein said adapter means further includes
a plurality of data buffers corresponding in number to a plurality of keyboards, a selector connected between said data buffers and said system bus, and a controller for time divisionally scanning said data buffers, said controller including means for interrupting said system controller when there is data in a data buffer, and in response to a command from said system controller controlling said selector so as to output the data from a scanned and detected data buffer to said system bus and means for outputting a keyboard number obtained from a scan signal.

5. A display terminal equipment comprising:

a plurality of input means each operated by an operator for inputting information;

display means for displaying display information;

control means connected to said display means for controlling different display information through at least one adapter means, to be displayed at different positions on said display means; and said at least one adapter means for interconnecting said plurality of input means and said control means, each of said adapter means controlling each of said input means;

wherein said control means comprises a system bus, a display controller connected to said system bus and having display range registers for storing display ranges of split screens and window and a plurality of cursor registers corresponding in number to display areas, said display controller controlling in such a manner that the renewal of the contents of said cursor registers is conducted within said display range and that the data received from said system bus are displayed at a position, on said display means, addressed by a cursor register corresponding to a display area number which is received together with said data, and a system control means including a memory and a system controller having at least one microprocessor, said memory has stored therein a control program for controlling said microprocessor, both of said system controller and said memory being connected to said system bus, said microprocessor controls said system bus, manages a correspondence between said input device and said display area, receives the data from said adapter means, adds said display area number to said data to be displayed on the area indicated by said number, and delivers said data together with said number to said display controller.

6. A display terminal equipment according to claim 5, wherein said display means is a CRT display device, and said display controller further comprises:

a screen memory;

a character generator for converting an output data from said screen memory into image dots for display;

parallel/serial converter for converting a parallel data from said character generator into a serial data and outputting said serial data to said CRT display device; and a CRT controller including a refresh/write controller, display range registers for storing display ranges of split screens and windows and a plurality of cursor registers corresponding in number to display areas, said display controller controlling in such a manner that the renewal of the contents of said cursor registers is conducted within said display range and that the data received from said system bus are displayed at a position, on said display means, addressed by a cursor register corresponding to a display area number which is received together with said data.

* * * * *